(12) United States Patent
Yen et al.

(10) Patent No.: US 7,926,778 B2
(45) Date of Patent: Apr. 19, 2011

(54) SUPPORT HAVING A TRANSMISSION MECHANISM USING A THIN CONNECTING PIECE

(75) Inventors: Ching-Hui Yen, Banciao (TW); Chun-Lung Chen, Banciao (TW); Hung-Wei Chang, Banciao (TW)

(73) Assignee: Syncmold Enterprise Corp., Taipei County (TW)

( * ) Notice: Subject to any disclaimer, the term of this patent is extended or adjusted under 35 U.S.C. 154(b) by 479 days.

(21) Appl. No.: 12/071,617

(22) Filed: Feb. 25, 2008

(65) Prior Publication Data

US 2009/0212175 A1    Aug. 27, 2009

(51) Int. Cl.
*A47G 29/00* (2006.01)

(52) U.S. Cl. ............... 248/371; 248/372.1; 248/123.11; 248/585; 361/679.06; 361/679.21

(58) Field of Classification Search ............ 248/123.11, 248/133, 176.1, 371, 372.1, 585, 919, 922, 248/923, 274.1, 289.11, 291.1, 292.11, 398; 361/679.02, 679.06, 679.21, 679.23, 681
See application file for complete search history.

(56) References Cited

U.S. PATENT DOCUMENTS

| | | | | |
|---|---|---|---|---|
| 6,695,274 B1* | 2/2004 | Chiu | ............................. | 248/371 |
| 7,338,019 B2* | 3/2008 | Liu et al. | .................. | 248/123.11 |
| 7,413,152 B1* | 8/2008 | Chen | .......................... | 248/176.1 |
| 7,690,605 B2* | 4/2010 | Lee et al. | ...................... | 248/133 |
| 7,694,929 B2* | 4/2010 | Jang | ............................ | 248/372.1 |
| 2009/0072112 A1* | 3/2009 | Lee et al. | ...................... | 248/371 |

* cited by examiner

*Primary Examiner* — Terrell Mckinnon
*Assistant Examiner* — Todd M. Epps
(74) *Attorney, Agent, or Firm* — Rosenberg, Klein & Lee

(57) ABSTRACT

A support having a transmission mechanism using a thin connecting piece includes a support base body, a transmission plate, a supporting plate and at least one thin connecting piece. The support base body has a base and brackets extending upwardly from the base. The distal end of the bracket is provided with a fixing sleeve. One end of the transmission plate is pivotally connected to the bracket. The supporting plate connected to the other end of the transmission plate. The supporting plate is provided with pivoting sleeves. The thin connecting piece is disposed on the transmission plate. Via this arrangement, the supporting plate can be kept vertical in synchronization with the swinging of the transmission plate. Thereby saving the space greatly and reducing the whole volume occupied by the support and peripheral elements. In this way, the assembling process is simplified, the productivity is increased, and the cost is reduced.

11 Claims, 6 Drawing Sheets

SUPPORT HAVING A TRANSMISSION MECHANISM USING A THIN CONNECTING PIECE

BACKGROUND OF THE INVENTION

1. Field of the Invention

The present invention is related to a support having a transmission mechanism using a thin connecting piece, and in particular to a support for supporting a certain object and positioning the object in a proper position.

2. Description of Related Art

A support is a member that is capable of supporting an object and bearing a force in a vertical direction. However, with the highly advancement of industrial technologies, the support can cooperate with links and other connecting elements to generate the positioning effect and other associated functions.

The conventional support is used to connect a supporting plate and a support body via links. A liquid crystal display and other electronic devices are disposed on the supporting plate. The links act to generate predetermined actions, thereby positioning the liquid crystal display- to a proper position and providing an optimal visual effect to the user.

However, with regard to the mechanism design, the links occupy a lot of space, so that the support becomes bulky and heavy. Therefore, such a problem may lose competitiveness in current market having a tendency toward compact and light products. Further, the assembling process of the links with peripheral elements is so complicated that the cost is inevitably increased.

Consequently, because of the above technical defects, the inventor keeps on carving unflaggingly through wholehearted experience and research to develop the present invention, which can effectively improve the defects described above.

SUMMARY OF THE INVENTION

The object of the present invention is to provide a support having a transmission mechanism using a thin connecting piece, which can save the space greatly and reduce the volume occupied by the support and peripheral elements.

Another object of the present invention is to provide a support having a transmission mechanism using a thin connecting piece, whereby the supporting plate can be kept vertical synchronously.

A further object of the present invention is to provide a support having a transmission mechanism using a thin connecting piece, whereby the assembling process is simplified, the productivity is increased, and the cost is reduced.

For achieving the object described above, the present invention provides a support having a transmission mechanism using a thin connecting piece, which includes: a support base body having a base and brackets extending upwardly from the base, the distal end of the bracket being provided with a fixing sleeve; a transmission plate with one end thereof being pivotally connected to the bracket; a supporting plate connected to the other end of the transmission plate, the supporting plate being provided with pivoting sleeves; and at least one thin connecting piece provided on the transmission plate, the thin connecting piece covering the fixing sleeves of the brackets and the pivoting sleeves of the supporting plate.

The present invention has advantageous effects as follows.

(1) The thin connecting piece can replace the conventional link to connect the support base body and the supporting plate, thereby saving the space greatly and reducing the whole volume occupied by the support and peripheral elements.

(2) The thin connecting piece is used to tow the pivoting sleeves, so that the supporting plate can be kept vertical in synchronization with the swinging of the transmission plate, thereby providing an optimal viewing angle for the user.

(3) The number of the peripheral elements used in the thin connecting piece is smaller than that of the link. Thus, the assembling process is simplified, the productivity is increased, and the cost is reduced.

In order to further understand the characteristics and technical contents of the present invention, a detailed description is made with reference to the accompanying drawings. However, it should be understood that the drawings are illustrative only but not used to limit the present invention thereto.

DETAILED DESCRIPTION OF THE PREFERRED EMBODIMENTS

Figure 1:
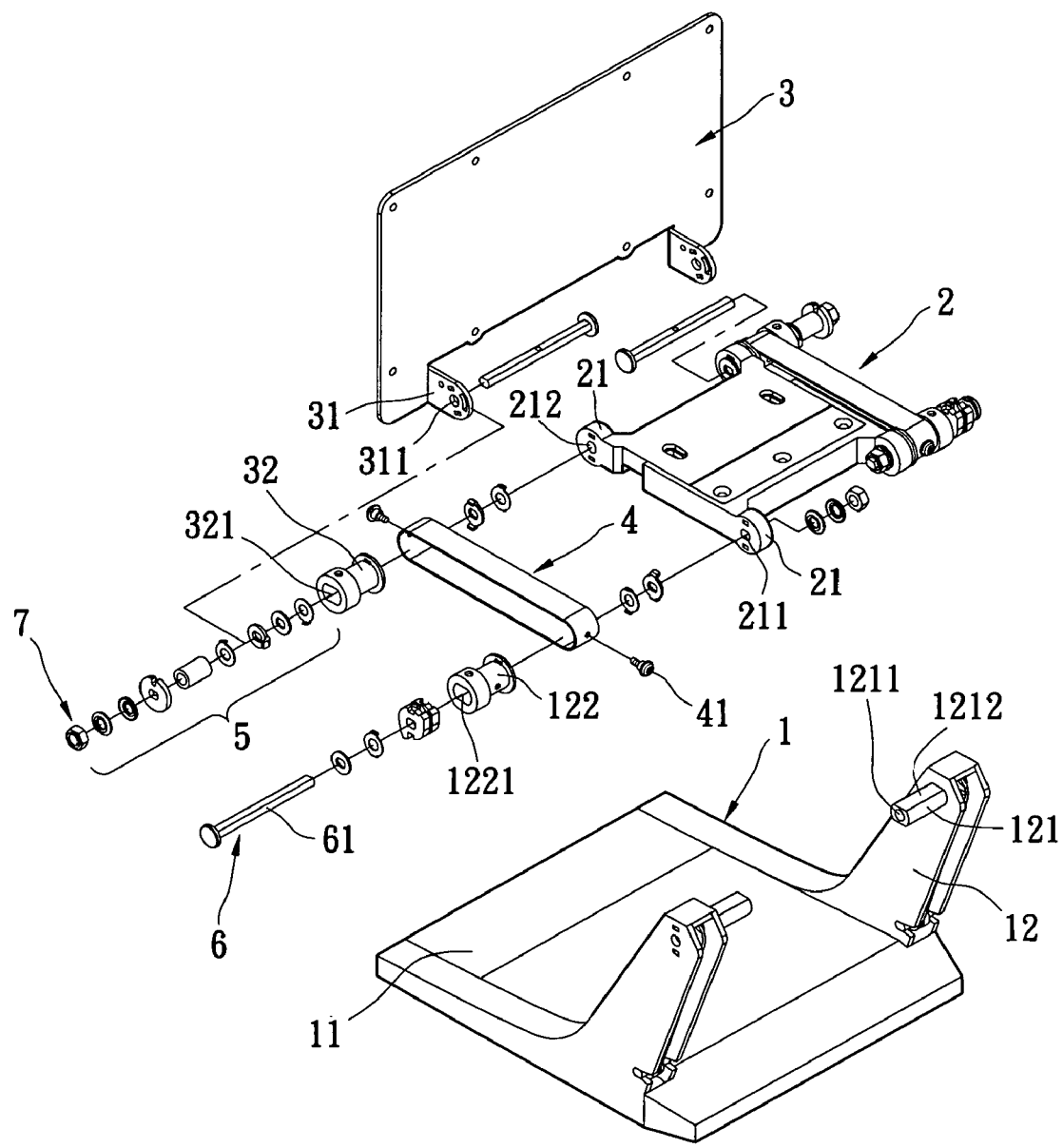
FIG. 1 is an exploded perspective view showing a support having a transmission mechanism using a thin connecting piece according to the present invention.

Please refer to FIGS. 1 to 6. The present invention provides a support having a transmission mechanism using a thin connecting piece, which includes a support base body 1, a transmission plate 2, a supporting plate 3, at least one thin connecting piece 4, a plurality of gasket assemblies 5, a plurality of bolts 6, and a plurality of nuts 7.

Figure 2:
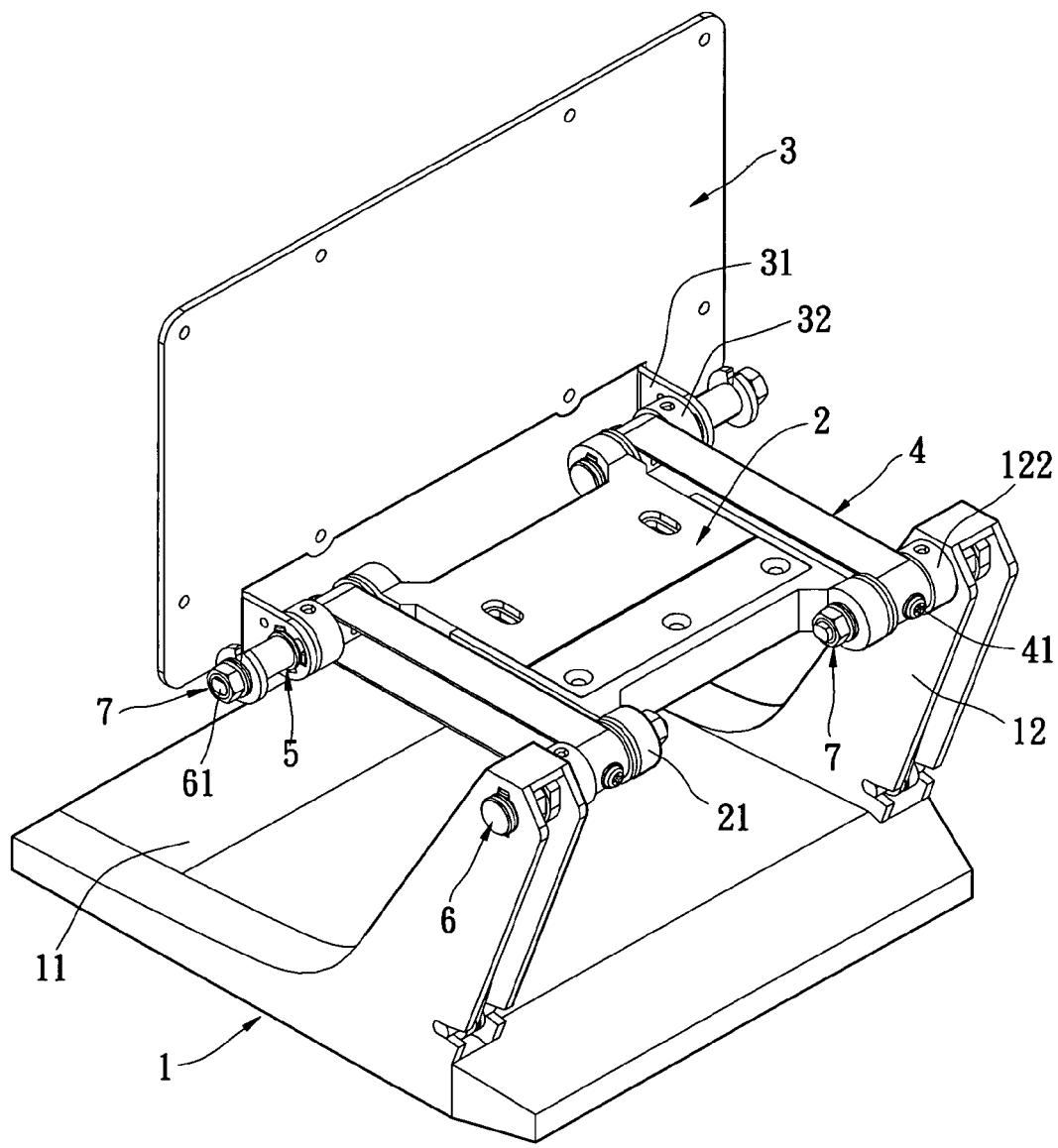
FIG. 2 is an assembled perspective view showing a support having a transmission mechanism using a thin connecting piece according to the present invention.
Figure 3:
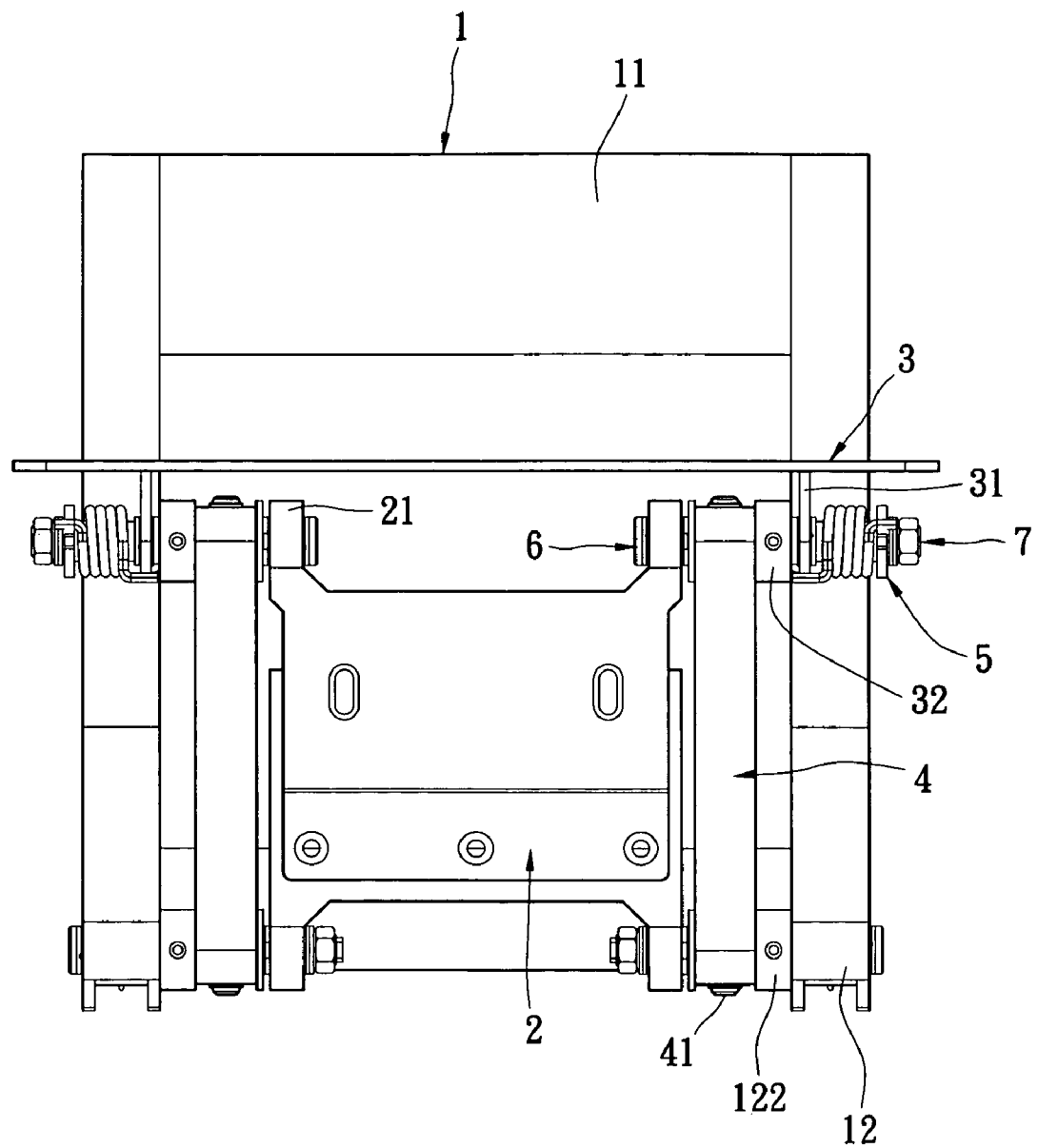
FIG. 3 is a top view showing a support having a transmission mechanism using a thin connecting piece according to the present invention.

Please refer to FIGS. 1 to 3. The support base body 1 comprises a base 11 and brackets 12. The number of the brackets 12 is dependent on the weight of an object to be supported by the support. In the present embodiment, there are two brackets 12. The two brackets 12 are formed by means of extending upwardly from the base 11. Each of the two brackets 12 has a connecting shaft 121. The two connecting shafts 121 extend from the two brackets 12 to face each other. The connecting shaft 121 has a first circular hole 1211 and a non-circular shaft portion 1212. The first circular hole 1211 axially penetrates through the connecting shaft 121 and the bracket 12. The non-circular shaft portion 1212 is of a circular cross section with both sides thereof flattened.

The distal end of each of the two brackets 12 is fixedly provided with a fixing sleeve 122. The fixing sleeve 122 has a non-circular hole 1221 that penetrates both ends of the fixing sleeve. The non-circular hole 1221 of the fixing sleeve 122 covers the non-circular shaft portion 1212 of the connecting shaft 121. Via the engagement between the above-mentioned non-circular geometries, the fixing sleeve 122 can be fixedly mounted on the connecting shaft 121 without any rotation.

One end of the transmission plate 2 is pivotally connected to the distal ends of the two brackets 12. Both ends of the transmission plate 2 have two pivoting portions 21 respectively. The pivoting portion 21 on one end of the transmission plate 2 has a first non-circular hole 211. The pivoting portion 21 on the other end of the transmission plate 2 has a second circular hole 212. The first non-circular hole 211 and the second circular hole 212 penetrate through both sides of the pivoting portion 21 of the transmission plate 2. The first non-circular hole 211 of the pivoting portion 21 on one end of the transmission plate 2 is provided to correspond to the first circular hole 1211 of the connecting shaft 121.

The supporting plate 3 is connected to the other end of the transmission plate 2. The supporting plate 3 has two bent plates 31. The bent plate 31 extends from the vicinity of the lower edge of the supporting plate 3 toward the pivoting portion 21 on the other end of the transmission plate 2. The two pivoting portions 21 on the other end of the transmission plate 2 are pivotally connected to the two bent plates 31. Each of the two bent plates 31 has a circular penetrating hole 311 penetrating both ends of the bent plate. The two opposite outer sides of the two bent plates 31 are provided with a pivoting sleeve 32 respectively. Each of the two pivoting sleeves 32 has a second non-circular hole 321 penetrating both ends of the pivoting sleeve. Further, the second non-circular hole 321, the circular penetrating hole 311 and the second circular hole 212 are provided to correspond to one another.

There are two thin connecting pieces 4. In the present embodiment, the two thin connecting pieces 4 are thin metallic sheets, which are formed into closed annular bands and provided on both sides of the transmission plate 2. The thin connecting piece 4 is disposed on the fixing sleeve 122 of the bracket 12 and the pivoting sleeve 32 of the supporting plate 3 and is locked by a fixing piece 41. In this way, when the transmission plate 2 swings, the thin connecting piece 4 generates a driving action on the pivoting sleeve 32.

The gasket assemblies 5 are provided at the connecting portions of the pivoting portions 21 on both ends of the transmission plate 2 with the connecting shafts 121 of the brackets 12 and the bent plates 31 of the supporting plate 3. The gasket assemblies 5 comprise various kinds of gaskets. With the gaskets of different shapes, the effects of pressing, positioning, restricting and slide-preventing can be generated, thereby achieving the desired movement.

Each of the bolts 6 has a non-circular portion 61. In the present embodiment, there are four bolts 6. Two of the bolts 6 penetrate from the outside of the two brackets 12 through the first circular holes 1211, the first non-circular holes 211 and the gasket assemblies 5, and are locked by the nuts 7, thereby pivotally connecting the pivoting portions 21 on one end of the transmission plate 2 to the two brackets 12. The non-circular portions 61 of the other two bolts 6 penetrate from the inside of the two bent plates 31 through the second circular holes 212, the second non-circular holes 321, the circular penetrating holes 311 and the gasket assemblies 5, and are locked by the nuts 7, thereby connecting the bent plates 31 and the pivoting sleeves 32 to the pivoting portions 21 on the other end of the transmission plate 2.

Further, the supporting plate 3 is fixed thereon with an electronic device such as a liquid crystal display (not shown). Via the combination of the above elements, the user can adjust the angle and position of the liquid crystal display.

Figure 4:
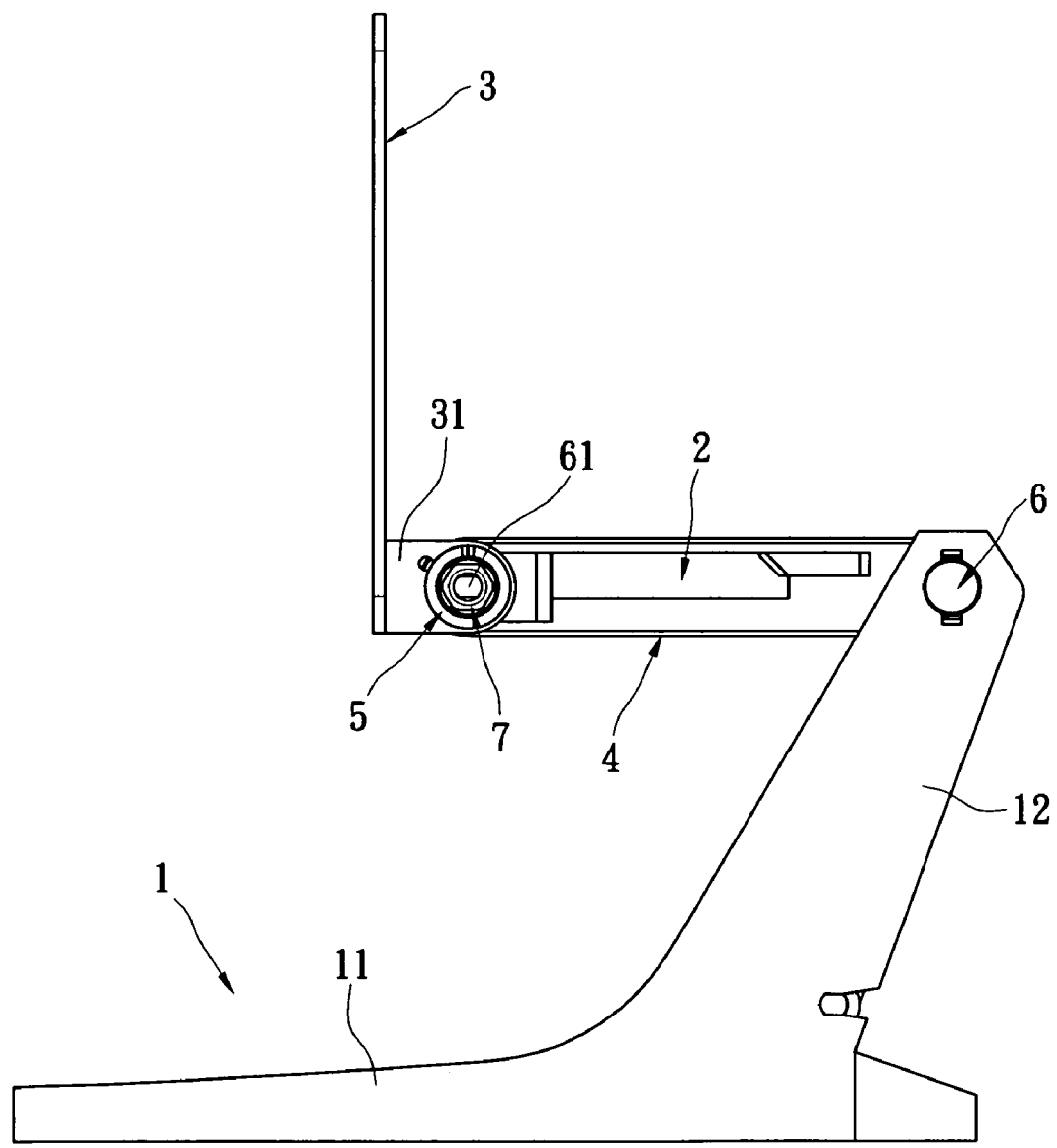
FIG. 4 is a side view showing a support having a transmission mechanism using a thin connecting piece according to the present invention.
Figure 5:
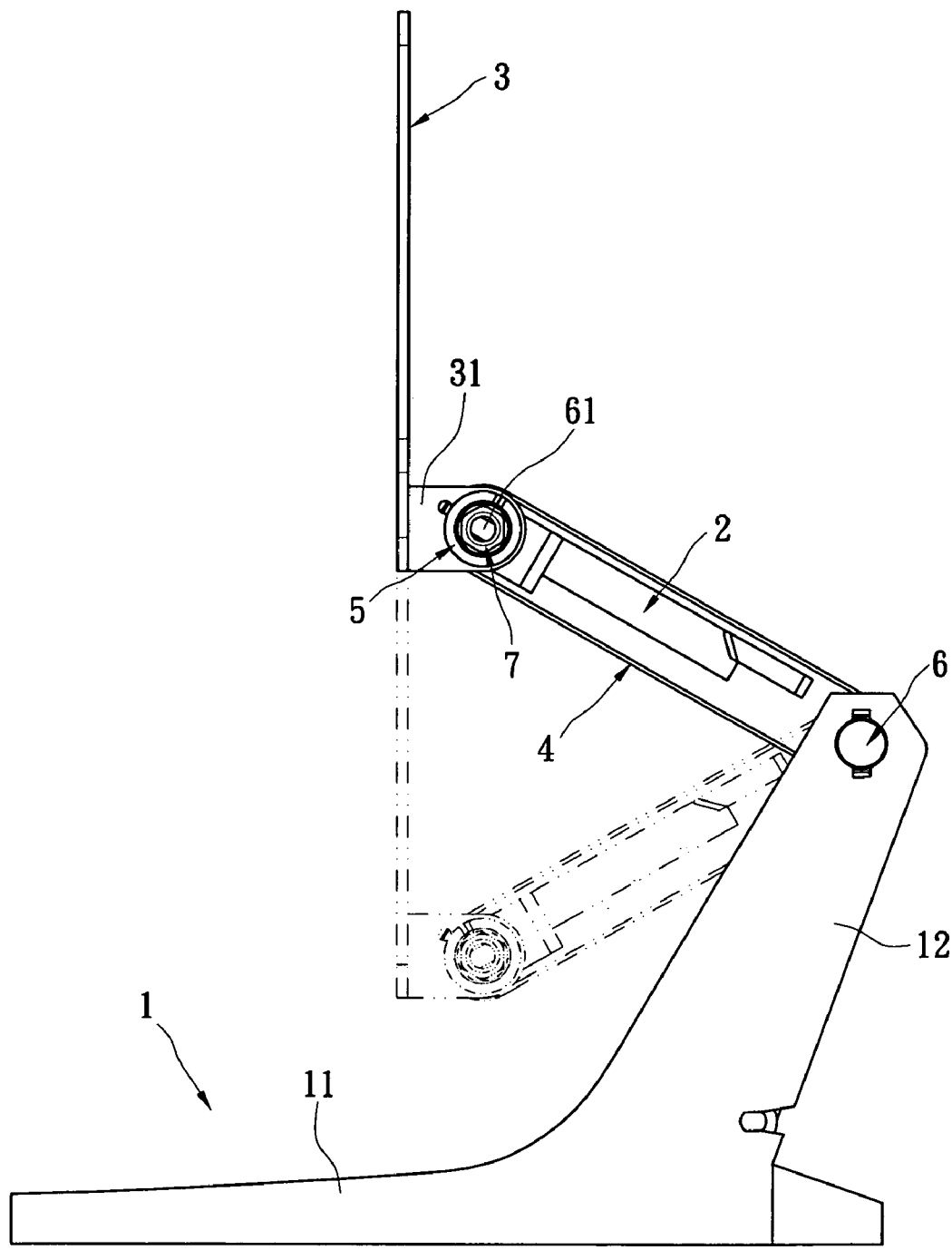
FIG. 5 is a schematic view showing the action of a support having a transmission mechanism using a thin connecting piece according to the present invention.

Please refer to FIGS. 4 and 5. Since the fixing sleeves 122 are fixed to the brackets 12, the pivoting sleeves 32 can rotate on both sides of the two pivoting portions 21 on the other end of the transmission plate 2. Therefore, when the transmission plate 2 swings, the thin connecting piece 4 synchronously tows the pivoting sleeve 32 to drive the supporting plate 3, so that the supporting plate 3 and the liquid crystal display disposed thereon are kept vertical during the swinging of the transmission plate 2, thereby providing an optimal visual effect for the user.

Figure 6:
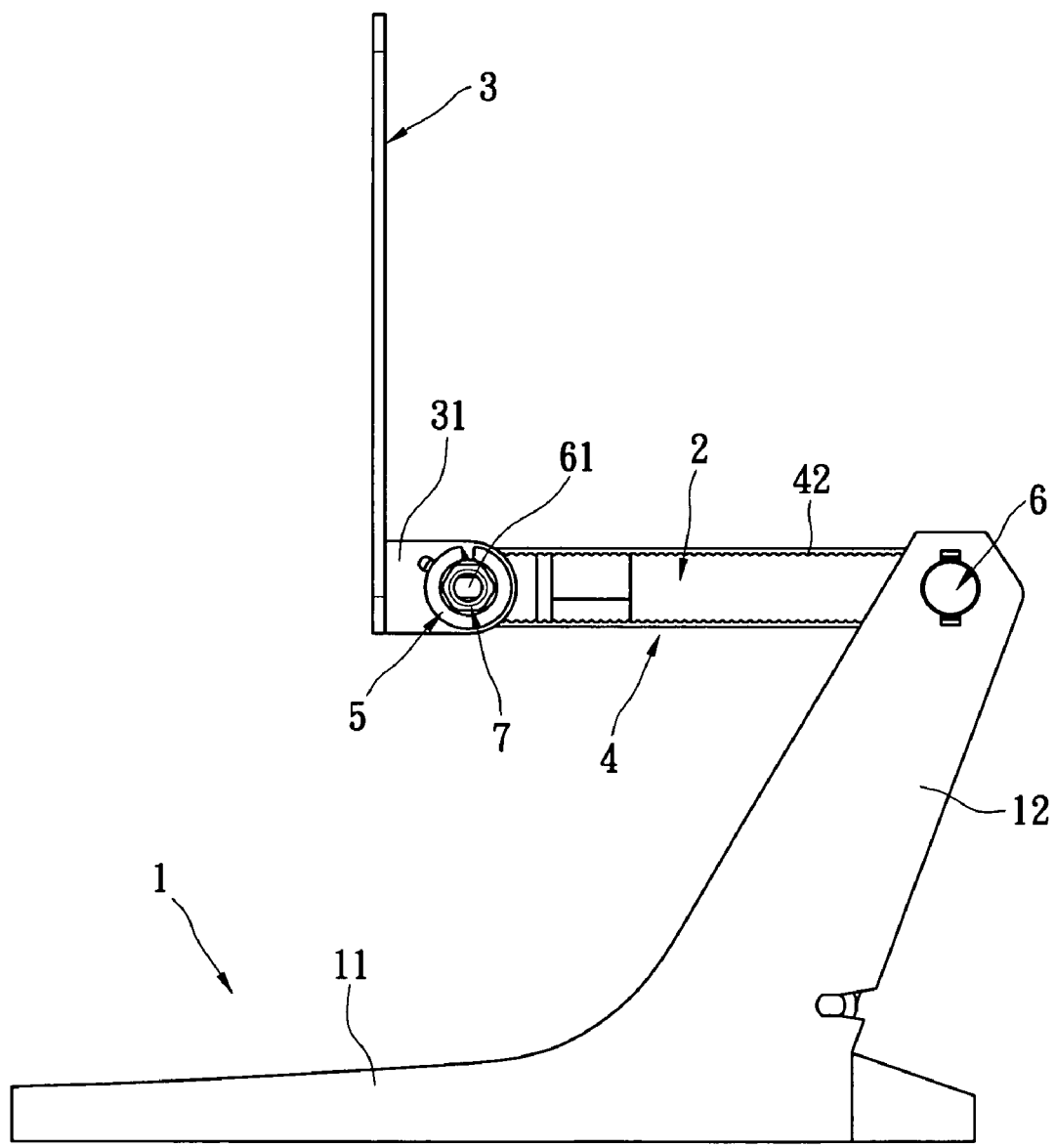
FIG. 6 is an assembled perspective view showing a support having a transmission mechanism using a thin connecting piece according to another embodiment of the present invention.

Please refer to FIG. 6, which shows another embodiment of the present invention. The thin connecting piece 4 can be also a belt having a plurality of engaging teeth 42. The thin connecting piece 4 covers the fixing sleeves 122 of the brackets 12 and the pivoting sleeves 32 of the supporting plate 3, and is engaged with the engaging teeth of the fixing sleeves 122 and the pivoting sleeves 32. In this way, the same effect as that of the previous embodiment can be achieved.

The present invention has advantageous effects as follows.

(1) The thin connecting piece 4 can replace the conventional link to connect the support base body 1 and the supporting plate 3, thereby saving the space greatly and reducing the whole volume occupied by the support and peripheral elements.

(2) The thin connecting piece 4 is used to tow the pivoting sleeve 32, so that the supporting plate 3 can be kept vertical in synchronization with the swinging of the transmission plate 2, thereby providing an optimal viewing angle for the user.

(3) The number of the peripheral elements used in the thin connecting piece 4 is smaller than that of the link. Thus, the assembling process is simplified, the productivity is increased, and the cost is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A supporting device having a transmission mechanism, comprising:
    a support base body having a base portion and at least one bracket portion extending upwardly from the base portion, the bracket portion having at least one fixing sleeve fixedly disposed thereon;
    a transmission plate having one end pivotally connected to the bracket portion;
    a supporting plate having at least one pivoting sleeve fixedly disposed thereon, the pivoting sleeve pivotably connected to the other end of the transmission plate; and
    at least one thin connecting piece being a flexile coupling piece and coupling the fixing sleeve of the support base body and the pivoting sleeve of the supporting plate without substantial slippage;
    whereby, the supporting plate is kept at a desired angle in synchronization with the movement of the transmission plate.

2. The supporting device connecting piece according to claim 1, wherein a distal end of the bracket portion has a connecting shaft, and the fixing sleeve covers on the connecting shaft.

3. The supporting device according to claim 2, wherein the connecting shaft has a non-circular portion, the fixing sleeve has a non-circular hole, the non-circular hole of the fixing sleeve covers on the non-circular shaft of the connecting shaft.

4. The supporting device according to claim 3, wherein both ends of the transmission plate have pivoting portions respectively, the pivoting portions on one end of the transmission plate are pivotally connected to the connecting shaft of the bracket portion, the supporting plate has two bent plates, the pivoting portions on the other end of the transmission plate are pivotally connected to the bent plates of the supporting plate.

5. The supporting device according to claim 4, further comprising a plurality of bolts and a plurality of nuts, the bolts penetrating respectively the pivoting portions on one end of the transmission plate and the connecting shaft of the bracket portion, and the pivoting portions on the other end of the transmission plate and the bent plates of the supporting plate, and being locked by the nuts.

6. The supporting device according to claim 5, further comprising a plurality of gasket assemblies, each of the gasket assemblies being provided at connecting portions of the pivoting portions on both ends of the transmission plate with the connecting shaft of the bracket portion and the bent plates of the supporting plate, and the gasket assemblies being locked by the bolts and the nuts.

7. The supporting device according to claim 5, wherein the connecting shaft has a first circular hole, the pivoting portion on one end of the transmission plate has a first non-circular hole, the bolt has a non-circular portion, the non-circular portion of the bolt penetrates through the first circular hole and the first non-circular hole.

8. The supporting device according to claim 7, wherein the pivoting portion on the other end of the transmission plate has a second circular hole, the pivoting sleeve has a second non-circular hole, the bent plate of the supporting plate has a circular penetrating hole, the non-circular portion of the bolt penetrates the second circular hole, the second non-circular hole and the circular penetrating hole.

9. The supporting device according to claim 1, wherein the flexile coupling piece is a thin sheet or a belt.

10. The supporting device of claim 1, wherein the transmission plate is pivotably disposed on the fixing sleeve of the support base body.

11. The supporting device of claim 1, further comprising at least two fixing pieces arranged on the fixing sleeve of the support base body and the pivoting sleeve of the supporting plate, respectively, for preventing relative displacement between the flexile couple piece and the fixing sleeve and the pivoting sleeve.

* * * * *